US005288969A

United States Patent [19]

Wong et al.

[11] Patent Number: 5,288,969

[45] Date of Patent: Feb. 22, 1994

[54] ELECTRODELESS PLASMA TORCH APPARATUS AND METHODS FOR THE DISSOCIATION OF HAZARDOUS WASTE

[75] Inventors: Alfred Y. Wong, Los Angeles; Andras Kuthi, Van Nuys, both of Calif.

[73] Assignee: Regents of the University of California, Oakland, Calif.

[21] Appl. No.: 746,419

[22] Filed: Aug. 16, 1991

[51] Int. Cl.[5] .......... B23K 9/00; F23G 5/10

[52] U.S. Cl. .......... 219/121.52; 219/121.43; 219/121.37; 219/121.48; 219/121.59; 219/121.54; 373/22; 110/250; 110/242

[58] Field of Search .......... 219/121.37, 121.38, 219/121.48, 121.54, 121.59, 121.52; 373/18-22; 315/111.21, 111.51; 110/242, 246, 250

[56] References Cited

U.S. PATENT DOCUMENTS

| | | | |
|---|---|---|---|
| 4,432,942 | 2/1984 | Adachi et al. | 219/121.37 |
| 4,438,706 | 3/1984 | Boday et al. | 110/238 |
| 4,479,443 | 10/1984 | Faldt et al. | 110/346 |
| 4,563,566 | 1/1986 | Reents | 219/121.37 |
| 4,644,877 | 2/1987 | Barton et al. | 110/250 |
| 4,849,675 | 7/1989 | Muller | 315/111.51 |
| 4,886,001 | 12/1989 | Chang et al. | 110/346 |
| 4,897,579 | 1/1990 | Hull et al. | 315/111.51 |

OTHER PUBLICATIONS

"Electrotechnologies for Waste and Water Treatment," EPRI EM-5418, Project 2416-25, Final Report, Oct. 1987.

Staley, Laurel J., "Hazardous Waste Decontamination with Plasma Reactors," HMC, Mar./Apr. 1990, pp. 67-71.

*Primary Examiner*—Mark H. Paschall

*Attorney, Agent, or Firm*—Robbins, Berliner & Carson

[57] ABSTRACT

A system and method are provided for the non-thermal destruction of hazardous waste material using an electrodeless inductively coupled RF plasma torch. The waste material is combined with a controllable source of free electrons, and the RF plasma torch is used to excite the free electrons, raising their temperature to 3000° C. or more. The electrons are maintained at this temperature for a sufficient time to enable the free electrons to dissociate the waste material as a result of collisions and ultraviolet radiation generated in situ by electron-molecule collisions. The source of free electrons is preferably an inert gas such as argon, which may be used as both the waste material carrier gas and the torch gas.

65 Claims, 5 Drawing Sheets

ELECTRODELESS PLASMA TORCH APPARATUS AND METHODS FOR THE DISSOCIATION OF HAZARDOUS WASTE

BACKGROUND OF THE INVENTION

This invention relates to the destruction of hazardous waste and, more particularly, to the destruction of hazardous waste using an electrodeless radio frequency (RF) inductively coupled plasma torch.

A major problem facing modern society is the disposal of toxic waste materials in a manner which minimizes harmful effects on the environment. An ideal waste disposal system is one which is capable of reducing hazardous waste to compounds suitable for environmental disposal. Such suitability is, of course, defined in terms of acceptable levels of pollution as determined by a variety of regulatory agencies.

Traditionally, hazardous waste disposal has taken the form of direct burial in land fills, or thermal processing of the waste, followed by burial of the solid residue, and release to the atmosphere of the volatile residue. None of these approaches have proven acceptable, due to the fact that the materials released to the environment remain as unacceptable sources of pollution.

A number of attempts have been made in the prior art to destroy waste material using direct current (DC) arc discharge type plasma torches. One such attempt is disclosed in Boday, et al. U.S. Pat. No. 4,438,706. This reference teaches the use of a DC arc discharge plasma torch in combination with an oxidizing agent for the thermochemical decomposition of certain types of waste material. The torch gas is air, and the waste material in vapor form is introduced along with oxygen downstream of the plasma arc generator, where it is heated by the torch gas.

In Faldt, et al. U.S. Pat. No. 4,479,443, there is disclosed the use of an arc discharge plasma torch to thermally decompose waste material. Waste material in the form of solid particles must be introduced downstream of the arc to avoid fouling of the torch as a result of particle adherence. Oxidizing agents such as oxygen and air are mixed with the waste either before, during or after the waste is heated by the torch gas. Sufficient oxidizing agents are required for the complete oxidation decomposition of the waste material.

In Barton, et al. U.S. Pat. No. 4,644,877, there is disclosed the use of a DC arc plasma burner for the pyrolytic decomposition of waste. An organic fluid is used to start and stabilize the plasma arc, and annular electromagnetic field coils are used to collimate the plasma, and a high pressure air supply is used to spin the arc. Provisions are made for feeding waste material downstream of the arc electrodes to prevent interference with the formation or generation of the plasma arc. The reference teaches away from the use of an inert gas to initiate or sustain the plasma, on the basis that such a burner is only suitable for low temperature applications. A reaction chamber following the burner is used to combine gas and particulate matter, which is quenched and neutralized with an alkaline spray. A mechanical scrubber is used to separate gases, which are withdrawn using an exhaust fan.

Chang, et al. U.S. Pat. No. 4,886,001, discloses what is described as an improvement over the above-discussed system of Barton, et al. The improvement is the use of water or methanol in place of a miscible mixture of a solvent of MEK and methanol for combining with waste materials comprising PCBs prior to introduction into the DC arc type plasma torch, and the use of pure oxygen instead of air as the torch gas. The object of these changes is to increase the waste processing rate. Also disclosed is the use of a solid separator which employs a partial vacuum to separate carryover gases.

The prior art plasma waste decomposition systems suffer from a variety of shortcomings which have prevented their widespread use in commercial applications. One shortcoming results from the fact that the waste material generally cannot be introduced directly into the plasma arc because such introduction causes contamination of the arc electrodes and subsequent erratic operation of the arc. Thus, the waste material is introduced downstream of the arc an is indirectly heated by the torch gas. This technique shortens the high temperature residence time of the waste material, resulting in incomplete decomposition.

Further, the performance of the arc is highly sensitive to the waste and carrier gas flow rate. Thus, the flow rates must be confined within narrow limits, leading to difficulties in controlling and maintaining system performance. Arc electrode erosion with use further complicates the maintenance, operation, stability and safety of the system. Small scale operation of DC arc plasmas is also very inefficient due in part to the minimum gas flow rate and electric power requirements needed to strike and sustain the arc. Scaling the prior art systems for operation at different waste throughput levels and with a variety of waste materials has proven to be difficult, requiring major system configuration changes which are expensive to accomplish.

Additionally, the need for organic, oxidizing, and/or reducing agents to be combined with the waste material in the prior art systems often results in highly undesirable compounds in the waste residue.

In summary, none of the prior art systems have provided a method of reducing hazardous waste to compounds suitable for environmental disposal.

SUMMARY OF THE INVENTION

A system and method are provided for the destruction of hazardous waste material using an electrodeless inductively coupled RF plasma torch. The waste material is combined with a controllable source of free electrons, and the RF plasma torch is used to excite the free electrons, raising their temperature to 3000° C. or more. The electrons are maintained at this temperature for a sufficient time to enable the free electrons to dissociate the waste material as a result of collisions and ultraviolet radiation generated in situ by electron-molecule collisions. The source of free electrons is preferably an inert gas such as argon, which may be used as both the waste material carrier gas and the torch gas.

In one embodiment of the invention, the plasma torch includes a chamber formed by an insulating cylindrical wall and having an inlet adjacent one end thereof for the introduction of the waste material and the source of free electrons, and an outlet adjacent the other end thereof for the removal of the dissociated waste material. An antenna is disposed around the circumference of and extends a predetermined length of the chamber, and is connected to a radio frequency (RF) power source. The antenna is in the form of a tube wound around the chamber circumference as a first helix and a second helix, both coaxial with the chamber axis, where the first helix is wound in a first direction and extends from a first point adjacent the one end of the chamber to a second point adjacent the center of the length of the chamber, and the second helix is wound in a second direction opposite the first direction and extends from a third point adjacent the center of the length of the chamber to a fourth point adjacent the other end of the chamber. An output terminal of the RF power source is connected to the first and second helixes adjacent the second and third points, and the first and second helixes are connected to ground potential adjacent the first and fourth points. The antenna may be positioned internal or external of the chamber wall. In the configuration where the coil is positioned inside the chamber wall, the wall may be formed of a metal such as stainless steel.

In another embodiment, the antenna is in the form of a plurality tubes, each formed as a curved rectangle, where the long sides of each rectangle are substantially parallel with the chamber centerline. The short sides of each rectangle curve around the chamber wall for a predetermined number of circumferential degrees, and the ends of each tube extend substantially parallel outward from the rectangle at a point substantially in the middle of one long side of the corresponding rectangle. This antenna configuration may be positioned external to the insulating chamber wall or internal to a stainless steel chamber wall.

A centrifuge separator is provided which communicates with the chamber outlet for separating heavy elements from the dissociated waste material. The centrifuge employs electrostatic, magnetostatic and electromagnetic forces to spin the dissociated waste material, causing heavy elements to separate therefrom. A scrubber is also provided which communicates with the separator for neutralizing the dissociated waste material which has been separated from the heavy elements.

A rotary kiln is provided which communicates with the chamber inlet for volatizing the waste material prior to its introduction into the chamber. A precipitator is connected between the kiln and the chamber inlet for separating from the volatized waste material solids having particles which exceed a predetermined size, and for diverting such particles from the chamber inlet.

DESCRIPTION OF THE PREFERRED EMBODIMENTS

Figure 1:
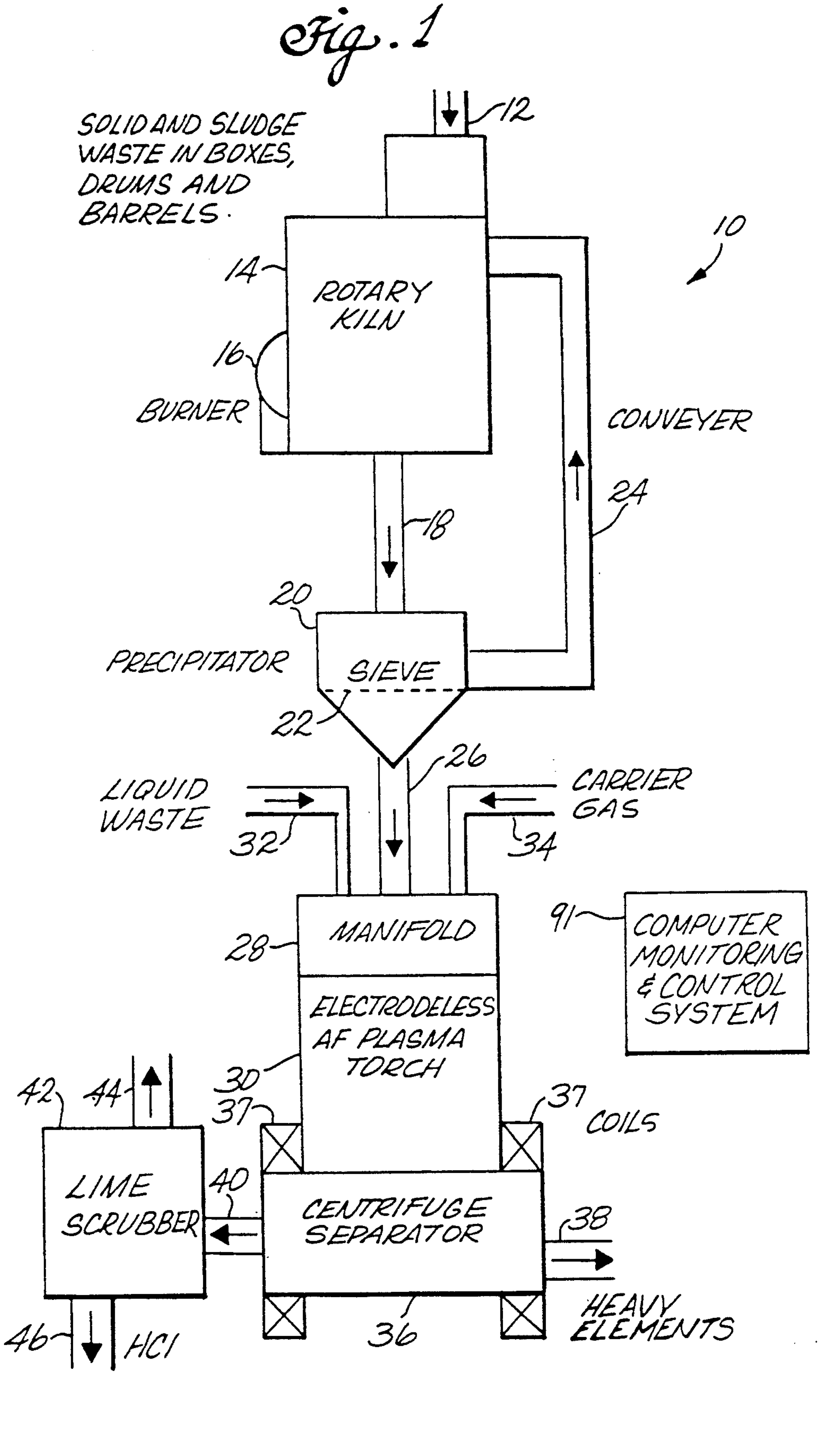
FIG. 1 is a block diagram showing the overall system employing the RF plasma torch for dissociation of waste in accordance with the teachings of the invention.

Referring to FIG. 1, there is shown a block diagram of a hazardous waste destruction system 10 constructed in accordance with the present invention. The system 10 is configured to process both solid and liquid waste materials. Solid and sludge waste is introduced into inlet 12 of a conventional rotary kiln 14 employing a burner 16 fired by, for example, natural gas or the like. One purpose of the kiln 14 is to volatize or liquefy a major portion of the solid and sludge waste, which is then introduced via lines 18 into a precipitator 20. The kiln 14 may be combined with a pulverizer (not shown) if necessary to reduce the waste to a manageable piece size.

One purpose of the precipitator 20 is to separate out from the kiln-processed waste those solid particles which exceed a predetermined size. A sieve 22 may be employed to aid in the separation. The oversized particles are trapped by the sieve 22 and recirculated from the precipitator 20 to the kiln 14 for further processing using a conveyer 24 or other suitable means.

The remaining kiln processed waste is provided via lines 26 to a manifold 28 which communicates with the inlet side of an electrodeless radio frequency (RF) discharge plasma torch 30. Also provided to the manifold 28 are liquid waste materials via line 32, and a carrier gas via line 34. The manifold 28 serves to combine the waste from the lines 32 and 26 with the carrier gas prior to their introduction into the torch 30.

The torch 30 acts as described below to dissociate the waste material into simple compounds such as water, carbon dioxide and HCl, along with heavy elements. The dissociated material is provided to a centrifuge separator 36 which uses magnetic coils 37 and field plates to generate a combination of magnetic and electric fields used to separate out the heavy elements, which are disposed of via line 38. The remaining waste material is provided via line 40 to an alkaline scrubber 42 which acts to neutralize most of the acid components in the residue. The neutralized components are discharged to the atmosphere via line 44, and the acid components are collected for disposal via line 46.

Figure 2:
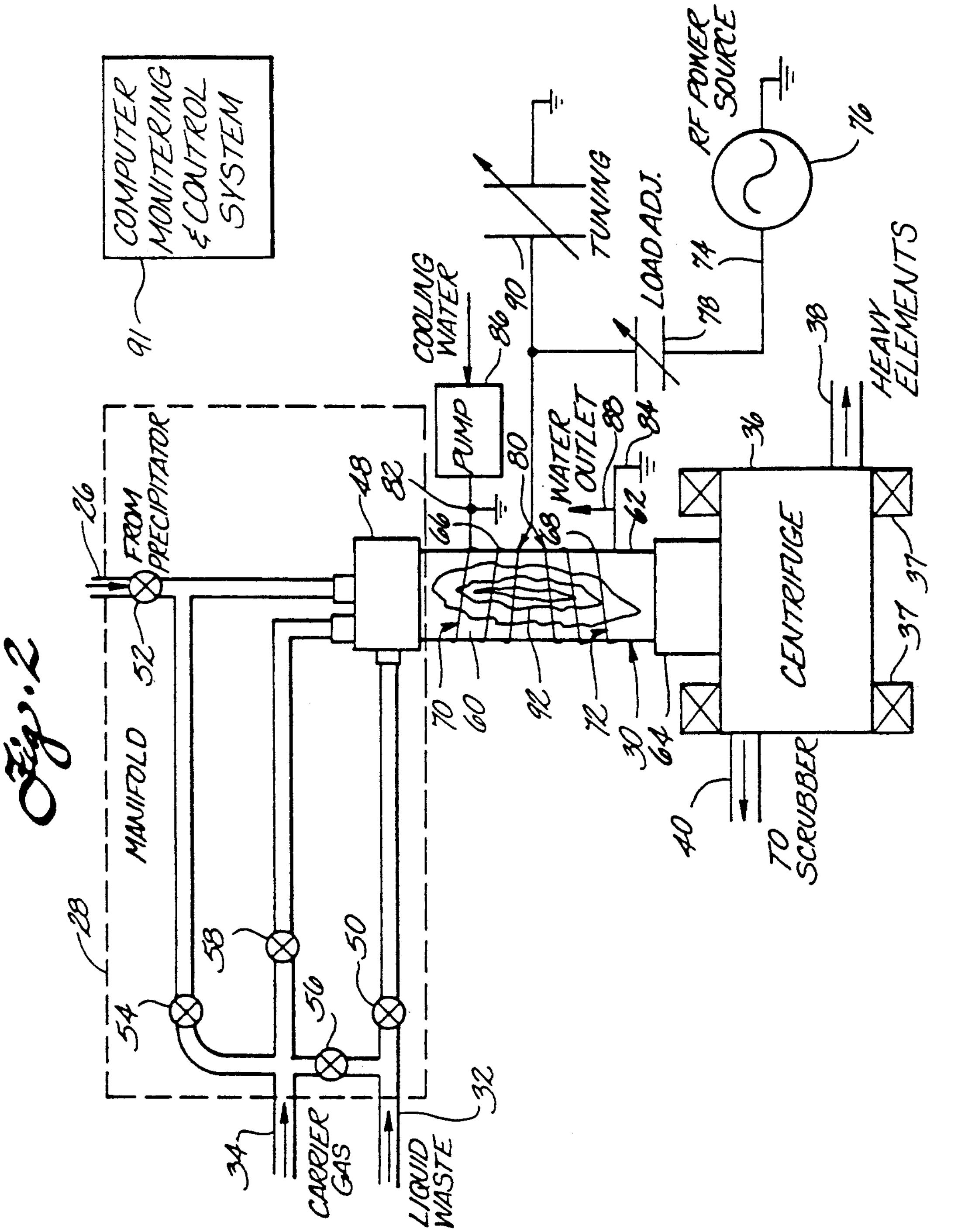
FIG. 2 is a schematic diagram showing the details of construction of the plasma torch of FIG. 1.

FIG. 2 is a schematic diagram showing the details of construction of a first embodiment of the plasma torch 30. The manifold 28 includes a variety of valves used to control waste and carrier gas flow to a header block 48. Valves 50 and 52 control the flow of liquid waste and waste from the precipitator 20, respectively. Valves 54 and 56 control the flow of carrier gas which is combined with the respective waste materials, and valve 58 controls the flow of the carrier gas directly to the header 48.

The header 48 communicates with the input end of a cylindrical chamber 60 formed by a ceramic wall 62. An opposite and outlet end of the chamber 60 connects with an outlet header 64 which communicates with the centrifuge 36. Surrounding the outer surface of the ceramic wall 62 are metal tubes 66 and 68, each formed of copper tubing or the like.

The tubes 66,68 form a first helix and a second helix, respectively, both coaxial with the chamber axis, where the first helix is wound in a first direction (shown by arrow 70) and extends from a first point adjacent the input end of the chamber to a second point adjacent the center of the length of the chamber, and the second helix is wound in a second direction (shown by arrow 72) opposite the first direction and extends from a third point adjacent the center of the length of the chamber to a fourth point adjacent the outlet end of the chamber.

An output terminal 74 of an RF power source 76 is connected through a variable load adjusting capacitor 78 to the first and second helixes 66,68, where they are joined together at ends 80, adjacent the second and third points. Current flows from the source 76 in the direction of the arrows from the ends 80 to the opposite ends 82,84. The opposite ends 82,84 of the helixes are connected to ground potential adjacent the first and fourth points. Cooling water is pumped through the tubes 66,68 using a pump 86 adjacent the end 82, and a water outlet 88 is provided adjacent the opposite end 84. A variable tuning capacitor is connected between the ends 80 and ground.

The operation of the plasma torch thus described is as follows. With the waste valves 50 and 52 closed, the carrier gas is introduced into the chamber 60 using valve 58. The gas exits the chamber via header 64, centrifuge 36, and the line 40 to the scrubber 42. As described below, the carrier gas, which also serves as the torch gas, is preferably one which is inert and is an abundant source of free electrons, such as argon gas. With the argon gas flowing through the chamber 60, and cooling water flowing through the tubes 66,68, the power source 76 is energized, and the capacitors 78 and 90 are used to adjust the load and tuning factors for the system. The power source frequency is generally in the range of 0.1 to 15 MHz. The tubes 66,68 act as a balanced, center-fed antenna to couple the RF energy into the chamber and to excite the free electrons in the argon gas. The excitation takes the form of electron oscillations induced by the RF field. The oscillations raise the temperature of the free electrons above 3000° C., preferably as high as 10,000° C. It has been found that the free electron temperature can and does far exceed the temperature of the remainder of the gas. For example, the free electron temperature may be 10,000° C., while the remainder of the gas is at a temperature of 3000° C. The excited electrons form a plasma 92 within the chamber 60, at which time the waste material (liquid, solid, gas or combinations of the above) is introduced using the valves 50 and 52. Valves 54 and 56 can be used to combine the argon gas with the waste material prior to introduction into the header 48, where the argon acts as a carrier gas to assist in moving the waste material.

The waste material, which may be hazardous or other types of waste, is introduced into the chamber 60 and is subjected to the excited free electrons, which act to break the molecular bonds of the waste, and dissociate it into simpler compounds, which are safer to dispose of in the environment. The excited free electrons also generate significant amount of ultraviolet energy which further aids the dissociation process. The dissociated waste products exit the chamber 60 through the header 64.

The degree of dissociation of the waste is affected by the free electron density and temperature, and the residence time of the waste material in the plasma. The electron density can be controlled by the carrier gas flow controls, and the temperature can be controlled by varying the RF power level. One way to control the residence time is to vary the angle between the chamber axis and the local vertical. Thus, while the chamber 60 is shown in a vertical position in FIG. 2, the chamber orientation can be varied to angles between vertical and horizontal to slow down the waste flow rate through the chamber. The chamber length can also be extended by combining multiple sections, end-to-end. This configuration also enables the choice of multiple temperature profiles.

A feature of the balanced center-fed antenna configuration described above is that the tube outer ends 82, 84 are at ground potential, which simplifies the installation of the water pump 86 and the water outlet 88. In an alternate embodiment of the torch 30, the antenna tubes 66,68 may be placed inside the chamber 60. Further, in this configuration, the chamber wall may be made of stainless steel or the like. One advantage of a metal chamber is the ease in which multiple sections can be joined, using flanges and the like. Another advantage is the durability of a metal enclosure as opposed to a ceramic enclosure. A detailed description of an internal antenna configuration is described below.

It will be appreciated that the RF torch 30 is substantially different from the DC arc type torches used in prior art systems as described above. First, the torch 30 is electrodeless, hence solving the problems of electrode erosion and contamination and arc sensitivity to system parameters. Further, the dissociation process described above does not require the use of organic, oxidizing or reducing agents in combination with the waste. Still further, this dissociation process is non-thermal, in that it relies on the bond-breaking behavior of excited electrons, not on pyrolytic or combustion processes.

Figure 3:
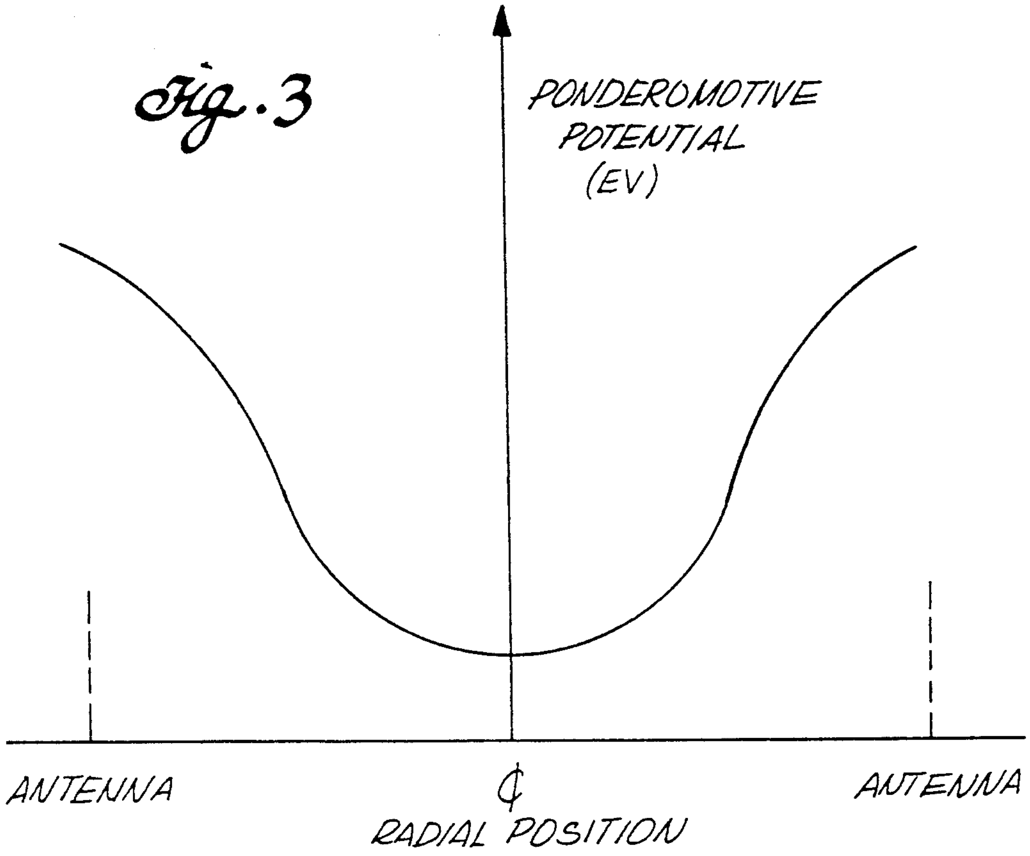
FIG. 3 is a graph showing the profile of the ponderomotive potential generated by the plasma torch of FIG. 2, as a function of the distance from the centerline of the chamber used to contain the plasma.

The non-thermal nature of the dissociation process of the present invention can be illustrated by the fact that the waste material temperature can remain in the range of 300°-1000° C., while being bombarded by free electrons at temperatures of 10,000° C. Another feature of the torch 30 of the present invention is the fact that the RF field generated by the antenna 66, 68 produces a ponderomotive field potential having a profile as a function of distance from the chamber axis as shown in FIG. 3. This field produces a force on the plasma gases which is proportional to the gradient of the potential profile. The result is that this field profile acts to collimate and center the plasma in the chamber without the need for external magnetic coils, which are required in prior art systems. Centering of the plasma is important to avoid damage to chamber walls. The fact that the temperature of the mixture in the chamber is much lower than that used in prior art thermal decomposition systems results in lower radiation losses, and hence greater system efficiency. Further, the chamber walls will sustain less erosion and damage as a result of the lower temperatures employed in the non-thermal process of the present invention.

Since the operation of the torch 30 is non-thermal in nature, the monitoring and control of the operation of the torch is greatly simplified from that required in prior art systems which rely on thermal decomposition processes. This is so because the combustion based systems are inherently unstable and their performance is highly dependant upon the nature of the waste material being processed. Thus, severe safety problems must be addressed in these systems, leading to complicated and unreliable control systems.

In contrast, the present invention lends itself to the use of computer based monitoring and control systems which provide near instantaneous control of the operation of the torch 30. Thus, start-up and shutdown sequences can take place safely and quickly. FIGS. 1 and 2 show a computer monitoring and control system 91 which is connected to control the power source 76, the pump 86, the valves 50–58, and other control elements, and is also connected to monitor a variety of sensors used to monitor the flow conditions in the various lines and the thermal and other conditions in the chamber 60. The system 91 can be configured to provide automatic system operation and safety functions with a minimum of complication.

A small-scale prototype of the torch 30 has been constructed and used for processing a variety of waste materials. The operation parameters of the prototype are as follows:

| | |
|---|---|
| RF POWER LEVEL | 5 KW |
| RF FREQUENCY | 13.56 MHz |
| CHAMBER DIAMETER | 5 cm |
| CARRIER GAS FLOW | 2 cfm |
| CHAMBER PRESSURE | 1 atm |
| TOTAL MASS FLOW | 3 kg/hr |
| ELECTRON DENSITY | $2.0 \times 10^{12}$ cm$^{-3}$ |
| ELECTRON TEMPERATURE | $10^{4}$° K. (average) |
| CARRIER GAS DENSITY | $2.0 \times 10^{18}$/cm$^{-3}$ (approx.) |
| CARRIER GAS TEMPERATURE | $<3.0 \times 10^{3}$° K. |

Studies have indicated that the prototype system may be easily scaled up in size to accommodate a variety of waste processing rates, unlike systems which use the DC arc discharge plasma torch. For example, the following operating parameters are anticipated for a large scale version of the system 10:

| | |
|---|---|
| RF POWER LEVEL | 1 MW |
| RF FREQUENCY | 400 kHz |
| CHAMBER DIAMETER | 35 cm |
| GAS FLOW | 100 cfm |
| TOTAL MASS FLOW | 500 kg/hr |

While the described system shows the placement of the helix antenna configuration external to the insulating ceramic chamber, this antenna may also be placed internal to a metal chamber, as discussed above.

Figure 4:
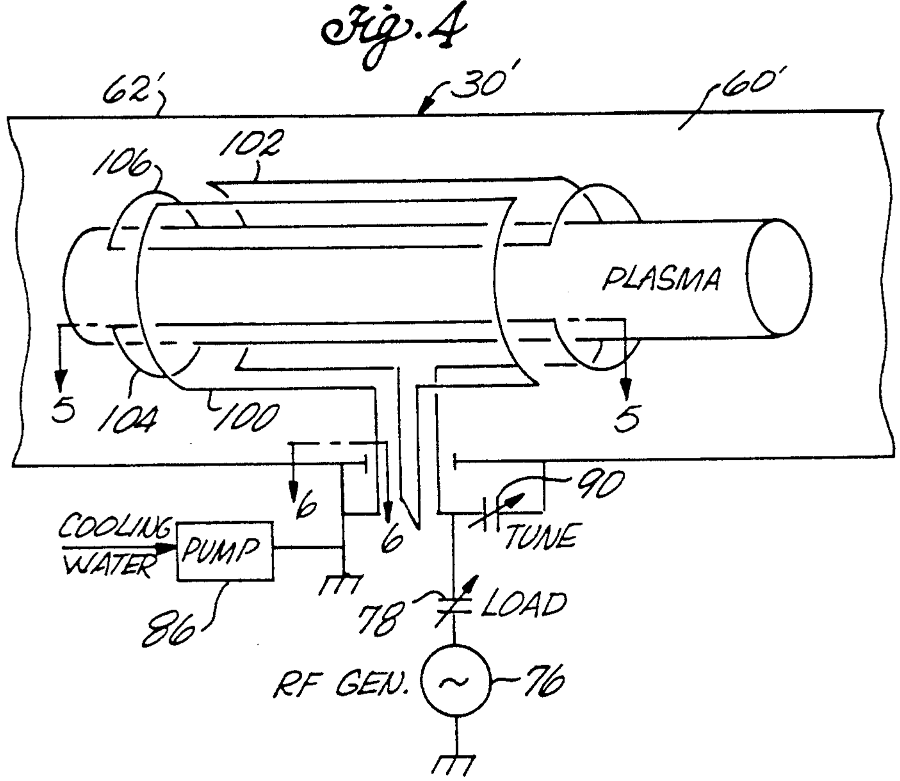
FIG. 4 is a schematic diagram showing an alternate antenna configuration for use in the interior of the chamber used in the plasma torch of FIG. 1.

FIG. 4 is a schematic diagram of an alternate embodiment 30′ of the RF plasma torch of the invention showing the use of a different antenna configuration which, like the balanced center-fed design, may be positioned external to an insulating chamber or internal to a metal plasma chamber. For purposes of illustration, an internal configuration will be shown.

Four tubes 100, 102, 104, 106, are provided, each formed as a curved rectangle, where the long sides of each rectangle are substantially parallel with the chamber centerline, the short sides of each rectangle curve around the chamber wall for a predetermined number of circumferential degrees, and the ends of each tube extend substantially parallel outward from the rectangle at a point substantially in the middle of one long side of the corresponding rectangle.

In FIG. 4, the short sides of each rectangle extend in overlapping quadrants around the chamber slightly more than 90 circumferential degrees. The tubes corresponding to rectangles in opposing quadrants are connected to the RF power source 76 in a series arrangement. The figure shows the connections for opposing rectangles 100 and 102. Similar connections are provided for opposing rectangles 104 and 106. The antenna could also be made up of only two rectangles, the short sides of each overlapping in semi-circular fashion around the chamber slightly more than 180 circumferential degrees or more. The tubes corresponding to each rectangle would then be connected to the RF power source in a series arrangement.

Figure 6:
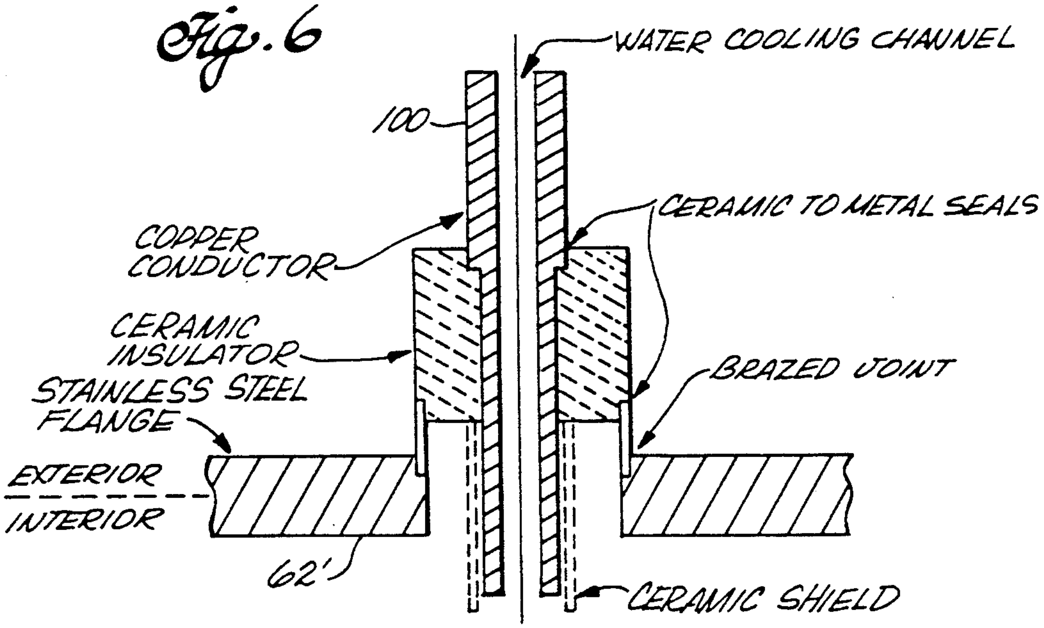
FIG. 6 is a cross-sectional diagram taken along the line 6—6 of FIG. 4 and showing the details of construction of antenna feed-through ports for use with the antenna configuration of FIG. 4.
Figure 5:
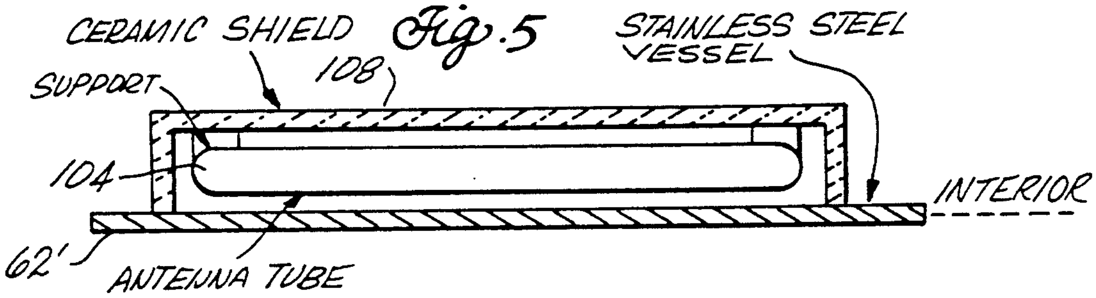
FIG. 5 is a cross-sectional diagram taken along the line 5—5 of FIG. 4 and showing the interior chamber placement of the antenna of FIG. 4.

The antenna in FIG. 4 is mounted inside a chamber 60′ formed of a stainless steel wall 62′. As shown in FIG. 5, a ceramic shield 108 is disposed around the antenna tube to protect it from the plasma. As shown in FIG. 6, ceramic to metal seals are used to provide feed-through capability in the wall 62′ for the ends of the antenna tubes. The configurations shown in FIGS. 5 and 6 can also be used with the balanced center-fed antenna configuration.

Figure 7:
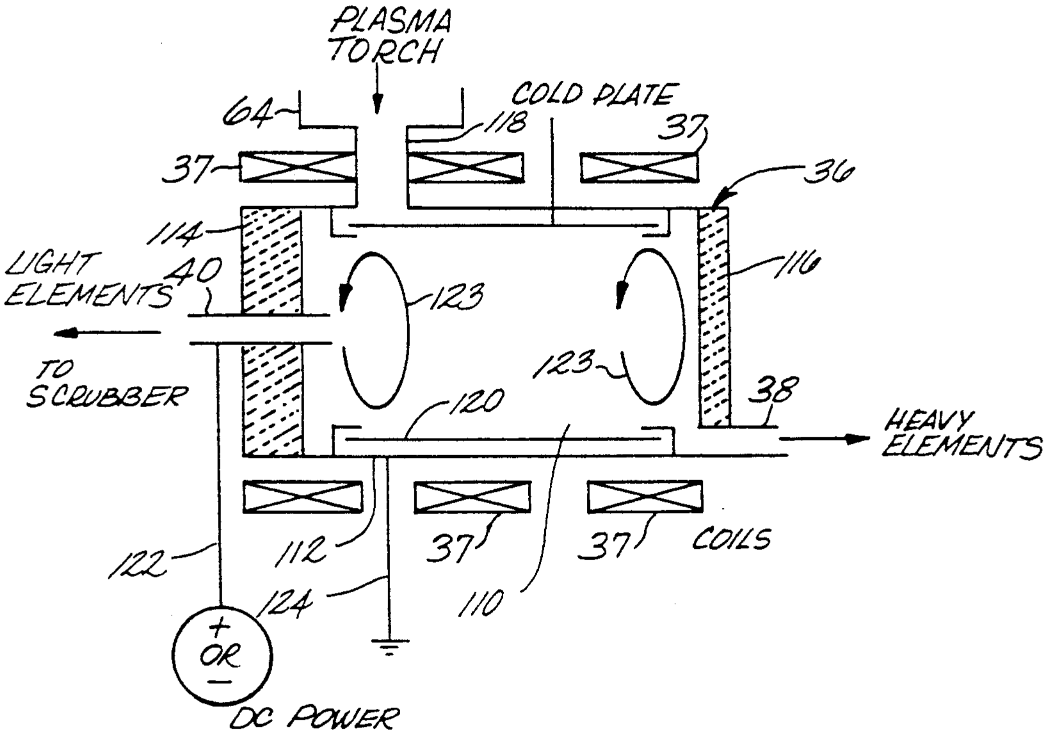
FIG. 7 is a schematic diagram showing the details of the centrifuge separator used in the system of FIG. 1.

FIG. 7 is a schematic diagram of the centrifuge separator 36 used in the system 10. The separator 36 includes a cylindrical chamber 110 formed of a metal side wall 112 and enclosed by inlet header 114 and outlet header 116. The headers 114,116 are made of an electrically insulating material such as ceramic or glass. The outlet line 40 to the scrubber 42 is metal and is supported in the header 114 and is coaxial with the chamber 110. The outlet line 38 for removal of heavy elements is supported in the header 116. An opening 118 is provided in the wall 112 which communicates with the outlet of the plasma torch 30 through the header 64. Supported within the chamber is a cylindrical metal cold plate 120.

Magnetic coils 37 surround the chamber 110 and are connected to a suitable source of DC power (not shown). Electrodes 122 and 124 are connected, respectively, to the line 40 and the wall 112, and are connected to a source of DC power with the polarity as shown. The outer chamber is normally grounded.

The centrifuge 36 is used for separating and quenching the products of dissociation emerging from the plasma torch 30. The centrifuge 36 is configured to provide a high separation rate (e.g. 10 grams/-second/meter of length) which enables it to process material from the torch 30, which has similar rates of dissociation.

The operating principle of the centrifuge 36 is based on the fact that the carrier gas combined with the material entering it from the torch 30 is still partially ionized. A radial electric field established by the electrodes 122 and 124 interacts with the axially imposed magnet field to further drive the rotation of the material. Thus, a magnetic field established by the coils 37 can be used to impart electromagnet angular momentum to the material as shown by the arrows 123, causing it to rotate at high angular velocity, which can reach values up to 10 km/second. The plasma is strongly coupled to the dissociated waste material by viscous collisions which cause it to be dragged along.

The final rotation velocity profile and magnitude depends on the viscous dissipation of the angular momentum and the rate of angular momentum input through the radial current and the axial magnet field. It is anticipated that values of radial current can reach 10 kAmperes, while the axial magnetic field strength can be up to 1 Tesla. Separation factors, or equivalently inner to outer density ratios, of several hundred can be reached in a 10 inch diameter chamber. An advantage of using this type of centrifuge with the torch 30 is the reduction and in some cases the elimination of reverse reactions or recombination of dissociation products from the torch 30, as a result of the spatial separation of the constituents. By separating the plasma generation process from the generation of rotation the efficiency of centrifugal separation is improved whereby the power input to the centrifuge 36 is not wasted on ionization but can be used for the generation of the centrifugal force field.

One specific application of the system 10 is the separation of heavy radioactive metallic contaminants from mixed toxic/radioactive waste. The heavy contaminants generally constitute a small fraction of the total mass flow, and therefore it is advantageous to provide for different tail and product flow rates by adjustable feed point, extraction point, and throttle positions. One such arrangement to accomplish this is where the plasma/gas mixture is introduced at the outer radius, the metallic vapor is condensed on the cold plate 120 at the outer wall, and the tail gas depleted from the radioactive contaminants is extracted at the axis. If further stages of separation is needed, the metallic vapor/gas mixture near the wall can be extracted at a small flow rate by throttling and can be led to further smaller centrifuge stages.

While the invention has been described, and preferred embodiments disclosed, it is anticipated that other modifications and adaptations will occur to those skilled in the art. It is intended, therefore, that the invention be limited only by the claims appended hereto.

What is claimed is:

1. Apparatus for the dissociation of waste material, comprising:

a source of waste material to be processed;

a source of gas capable of forming free electrons in a plasma when excited to a high temperature;

combining means for combining the waste material with the gas;

a reactor chamber;

means for transporting the combination of the waste material and the gas through the reactor chamber;

excitation means for exciting the gas in the reactor chamber with electromagnetic energy to form a plasma including free electrons, wherein the excitation means comprises an RF plasma torch and the chamber is formed by a cylindrical wall and has inlet means adjacent one end thereof for the introduction of the waste material and the source of free electrons, and outlet means adjacent the other end thereof for the removal of the dissociated waste material, wherein the plasma torch comprises an antenna disposed around the circumference of and extending a predetermined length of the chamber, wherein the antenna is in the form of a tube wound around the chamber circumference and formed as a first helix and a second helix, both co-axial with the chamber axis, wherein the first helix is wound in a first direction and extends from a first point adjacent the one end of the chamber to a second point adjacent the center of the length of the chamber, and the second helix is wound in a second direction opposite the first direction and extends from a third point adjacent the center of the length of the chamber to a fourth point adjacent the other end of the chamber, the plasma torch further including means connecting the antenna to a radio frequency (RF) power source, including means for connecting an output terminal of the RF power source to the first and second helixes adjacent the second and third points, and for connecting the first and second helixes to ground potential adjacent the first and forth points; and timing means for maintaining the free electrons at the raised temperature level in the reactor chamber for a sufficient time to enable the free electrons to dissociate the waste material.

2. The apparatus of claim 1 where the tube is positioned external to the chamber wall.

3. The apparatus of claim 1 where the tube is positioned internal to the chamber wall.

4. Apparatus for the dissociation of waste material, comprising:

a source of waste material to be processed;

a source of gas capable of forming free electrons in a plasma when excited to a high temperature;

combining means, for combining the waste material with the gas;

a reactor chamber;

means for transporting the combination of the waste material and the gas through the reactor chamber;

excitation means for exciting the gas in the reactor chamber with electromagnetic energy to form a plasma including free electrons, wherein the excitation means comprises an RF plasma torch and the chamber is formed by a cylindrical wall and has inlet means adjacent one end thereof for the introduction of the waste material and the source of free electrons, and outlet means adjacent the other end thereof for the removal of the dissociated waste material, wherein the plasma torch comprises an antenna disposed around the circumference of and extending a predetermined length of the chamber, wherein the antenna is in the form of a plurality of tubes, each formed as a curved rectangle, wherein the long sides of each rectangle are substantially parallel with the chamber centerline, the short sides of each rectangle curve around the chamber wall for a predetermined number of circumferential degrees, and the ends of each tube extend substantially parallel outwardly from the rectangle at a point substantially in the middle of one long side of the corresponding rectangle, the plasma torch further including means for connecting the antenna to a radio frequency (RF) power source; and timing means for maintaining the free electrons at the raised temperature level in the reactor chamber for a sufficient time to enable the free electrons to dissociate the waste material.

5. The apparatus of claim 4 in which the antenna includes two rectangles, the short sides of each extending in semi-circular fashion around the chamber 180 circumferential degrees or more, and further including means for connecting the tubes corresponding to each rectangle to the RF power source in a series arrangement.

6. The apparatus of claim 4 in which the antenna includes four rectangles, the short sides of each extending in quadrants around the chamber 90 circumferential degrees or more, and further including means for connecting the tubes corresponding to rectangles in opposing quadrants to the RF power source in a series arrangement.

7. An apparatus for the dissociation of waste material, comprising:

a source of a gas, which in turn is a source of a substantial number of free electrons, for establishing a plasma in a reaction chamber;

a reaction chamber apparatus, including means for directing the gas into the reaction chamber;

means for exciting the free electrons in the gas in the reaction chamber to a temperature which is high enough to produce a dissociation of the waste material while exciting the remainder of the gas only to a temperature which is substantially lower than the temperature of the excited free electrons, wherein the gas, including the high temperature free electrons, defines a plasma in the reaction chamber;

means for moving the waste material into the plasma; and means for controlling the density and temperature of the free electrons in the plasma and the residence time of the waste material in the plasma such that the waste material is dissociated while the temperature of the waste material remains substantially lower than the temperature of the free electrons in the plasma.

8. An apparatus of the claim 7 wherein the reaction chamber is at approximately at least atmospheric pressure.

9. An apparatus of claim 7 wherein the excitation means excites the free electrons in the plasma in the reaction chamber sufficiently that the free electrons emit a substantial amount of ultraviolet energy, which aids significantly in the dissociation of the waste material.

10. An apparatus of claim 7, wherein the temperature of the waste material is at least an order of magnitude lower than the temperature of the free electrons.

11. An apparatus of claim 10, wherein the temperature of the free electrons is significantly greater than 3000° C.

12. An apparatus of claim 10, wherein the temperature of the free electrons is approximately at least 10,000° C.

13. An apparatus of claim 7, wherein the gas is an inert gas.

14. An apparatus of claim 7, wherein said moving means includes means using said gas to carry the waste material into the plasma.

15. An apparatus of claim 7, wherein the exciting means includes an electrodeless, radio frequency antenna, which in operation couples RF energy into the reaction chamber.

16. An apparatus of claim 15, wherein the antenna is a balanced, center-fed antenna, grounded at both ends thereof, the antenna surrounding the reaction chamber.

17. An apparatus of claim 15, wherein the RF energy has a frequency in the range of 0.1–15 MHz.

18. An apparatus of claim 7, further including separating means in communication with an output end of the reaction chamber for separating the dissociated waste material while the dissociated waste material is still in a plasma condition.

19. An apparatus of claim 18, wherein the separating means includes means for applying magnetic and electric fields to the dissociated waste material, said fields being so oriented as to spin the dissociated waste material so as to separate heavy elements from the remainder of the dissociated waste material.

20. An apparatus of claim 19, wherein the electric field is applied radially to the dissociated waste material while the magnetic field is applied axially.

21. An apparatus of claim 19, including scrubber means communicating with the separating means for further treatment of said remainder of the dissociated waste material.

22. An apparatus of claim 7, wherein the excitation means includes an antenna assembly which surrounds the reaction chamber and means for driving the antenna so that a radio frequency electric field is coupled into the reaction chamber to produce the plasma, wherein the RF field is such as to produce a ponderomotive field potential within the chamber, which produces a force on the plasma proportional to the gradient of the electric potential across the chamber, the ponderomotive field potential producing a boundary for the plasma within the chamber.

23. An apparatus of claim 22, wherein the plasma is maintained approximately central of the reaction chamber, the boundary for the plasma being slightly inboard of the reaction chamber from the walls thereof, the boundary producing a stable plasma within the reaction chamber.

24. An apparatus of claim 7, including computer means for automatically monitoring operating conditions in the reaction chamber and the flow of gas and waste material into the reaction chamber.

25. An apparatus of claim 7, wherein the controlling means includes means for controlling the flow of gas into the reaction chamber and the amount of excitation applied to the gas in the reaction chamber.

26. An apparatus of claim 7, wherein the controlling means includes means for establishing regions of different free electron temperatures along the length of the reaction chamber.

27. An apparatus of claim 7, wherein the excitation means includes antenna means arranged around the circumference of and extending a predetermined length of the chamber and means connecting the antenna to a radio frequency (RF) power source, wherein the antenna is in the form of a tube wound around the chamber circumference, formed as a first helix and a second helix, both coaxial with the chamber axis, wherein the first helix is wound in a first direction and extends from a first point adjacent one end of the chamber to a second point adjacent the center of the length of the chamber, and the second helix is wound in a second direction opposite the first direction, extending from a third point adjacent the center of the length of the chamber to a fourth point adjacent the other end of the chamber, and further includes connecting means for connecting an output terminal of the RF power source to the first and second helixes adjacent the second and third points, and for connecting the first and second helixes to ground potential adjacent the first and fourth points.

28. An apparatus of claim 27, wherein the antenna is positioned external to the chamber wall.

29. An apparatus of claim 27, wherein the antenna is positioned internal to the chamber wall.

30. An apparatus of claim 7, wherein the excitation means includes antenna means arranged around the circumference of and extending a predetermined length of the chamber and means connecting the antenna to a radio frequency (RF) power source, wherein the antenna is in the form of a plurality of tubes, each formed as a curved rectangle, wherein the long sides of each rectangle are substantially parallel with the chamber center line, and wherein the short sides of each rectangle curve around the chamber wall for a predetermined number of circumferential degrees, the ends of each tube extending substantially parallel outwardly from the rectangle at a point substantially in the middle of one long side of the corresponding rectangle.

31. An apparatus of claim 30, wherein the antenna includes two rectangles, the short sides of each rectangle extending in semicircular fashion around the chamber 180 circumferential degrees or more, and further including means for connecting the tubes corresponding to each rectangle to the RF power source in a series arrangement.

32. An apparatus of claim 30, wherein the antenna includes four rectangles, the short sides of each rectangle extending in quadrants around the chamber 90 circumferential degrees or more, and further including means for connecting the tubes corresponding to rectangles in opposing quadrants to the RF power source in a series arrangement.

33. An apparatus of claim 7, wherein the controlling means includes means for varying the angle of the reaction chamber so as to vary the residence time of the waste material in the plasma.

34. A method for the dissociation of waste material, comprising:

providing a gas, which is a source of a substantial number of free electrons, for establishing a plasma within a reaction chamber;

directing the gas into the reaction chamber;

exciting the free electrons in the gas in the reaction chamber to a temperature which is high enough to produce a dissociation of the waste material while exciting the remainder of the gas only to a temperature which is substantially lower than the temperature of the free electrons, wherein the gas, including the high temperature free electrons, defines a plasma in the reaction chamber;

moving the waste material into the plasma; and controlling the density and temperature of the free electrons in the plasma and the residence time of the waste material in the plasma such that the waste material is dissociated while the temperature of the waste material remains substantially lower than the temperature of the free electrons in the plasma.

35. A method of claim 34, wherein the gas is an inert gas.

36. A method of claim 34, wherein the method is carried out at approximately at least atmospheric pressure.

37. A method of claim 34, including the step of exciting the free electrons in the plasma in the reaction chamber sufficiently that the free electrons emit a substantial amount of ultraviolet energy which aids significantly in the dissociation of the waste material.

38. A method of claim 34, wherein the temperature of the waste material is at least an order of magnitude lower than the temperature of the free electrons.

39. A method of claim 38, wherein the temperature of the free electrons is substantially greater than 3000° C.

40. A method of claim 38, wherein the temperature of the free electron is approximately at least 10,000° C.

41. A method of claim 34, including the step of separating the dissociated waste material in a predetermined manner while the dissociated waste material is still in a plasma condition.

42. A method of claim 41, wherein the step of separating includes the step of applying both magnetic and electric fields to the dissociated waste material so as to spin the dissociated waste material, thereby separating the heavy elements from the remainder of the dissociated waste material.

43. A method of claim 42, wherein the electric field is applied radially to the dissociated waste material, while the magnetic field is applied axially.

44. A method of claim 42, including the step of further treating the remainder of the dissociated waste material by scrubbing.

45. A method of claim 34, including the step of moving the waste material into the plasma with said gas.

46. A method of claim 34, wherein the step of exciting includes the step of coupling radio frequency (RF) energy into the reaction chamber from an antenna to which is connected a source of RF energy, such that an RF field is established in the reaction chamber.

47. A method of claim 46, wherein the RF field in the reaction chamber is such as to produce a ponderomotive field potential within the chamber, which produces a force on the plasma proportional to the gradient of the electric potential across the chamber, the ponderomotive force producing a boundary for the plasma within the chamber.

48. A method of claim 47, wherein the RF field is such as to center the plasma within the chamber, the boundary for the plasma being slightly inboard of the reaction chamber from the walls thereof, thereby maintaining the plasma away from chamber walls, and producing a stable plasma within the reaction chamber.

49. A method of claim 46, wherein the RF energy has a frequency in the range of 0.1 MHz–15 MHz.

50. A method of claim 34, including the step of volatilizing the waste material prior to its movement into the plasma.

51. A method of claim 50, including the further step of separating particles which exceed a predetermined size from the remainder of the volatilized waste material, and diverting such particles from the plasma.

52. A method of claim 34, including the step of automatically monitoring operating conditions in the reaction chamber and the flow of gas and waste material into the reaction chamber.

53. A method of claim 34, including the step of controlling the flow of gas into the reaction chamber and the amount of excitation applied to the gas in the reaction chamber.

54. A system for the dissociation of waste material, comprising:

means for initially processing waste material to reduce the particulate size of the waste material;

means for separating out particles from the preliminarily processed waste material which exceed a predetermined size;

a source of a gas, which in turn is a source of a substantial number of free electrons, for establishing a plasma in a reaction chamber;

a reaction chamber;

means for directing the gas to the reaction chamber;

mean for exciting the free electrons in the gas in the reaction chamber to a temperature which is high enough to dissociate the waste material while exciting the remainder of the gas only to a temperature which is substantially less than the temperature of the free electrons, wherein the gas, including the high temperature free electrons, defines a plasma in the reaction chamber;

means for moving the waste material into the plasma;

means for controlling the density and temperature of the free electrons in the plasma and the residence time of the waste material in the plasma such that the waste material is dissociated, to produce dissociated products, while the temperature of the waste material remains substantially lower than the temperature of the free electrons in the plasma; and a separator means for separating the products of dissociation in a predetermined manner while the products of dissociation are still in a plasma condition.

55. A system of claim 54, wherein the exciting means includes an antenna and a source of radio frequency (RF) energy connected thereto, such that in operation, RF energy is coupled into the reaction chamber.

56. A system of claim 54, wherein the system operates approximately at least at atmospheric pressure.

57. A system of claim 54, wherein the free electrons are sufficiently excited to emit a substantial amount of ultraviolet energy, which aids significantly in the dissociation of the waste material.

58. A system of claim 54, wherein the temperature of the waste material in the plasma is at least an order of magnitude lower than the temperature of the free electrons.

59. A system of claim 54, wherein the preliminary processing means includes a burner for processing the waste material by heat.

60. A system of claim 54, wherein the separating means includes a precipitator means for separating particles of said predetermined size.

61. A system of claim 54, wherein the separator means includes means for applying both a magnetic field and an electric field to the products of dissociation so that the products of dissociation are rotated at a sufficiently high velocity to separate heavy elements from the other dissociation products.

62. A system of claim 61, including scrubber means communicating with the separating means for further treatment of said other dissociation products.

63. A system of claim 54, wherein the controlling means includes means for controlling the flow rate of the gas into the reaction chamber and for controlling the amount of excitation applied to the gas in the reaction chamber.

64. A system of claim 54, wherein the controlling means includes means for varying the angle of the reaction chamber so as to vary the residence time of the waste material in the plasma.

65. A system of claim 54, wherein the excitation means is arranged so that there are a plurality of temperature profiles of the plasma along the length of the reaction chamber.

* * * * *